United States Patent [19]

Suzuki

[11] Patent Number: 4,942,562
[45] Date of Patent: Jul. 17, 1990

[54] PICKUP ACTUATOR FOR DISK-TYPE MEDIA

[75] Inventor: Jun Suzuki, Saitama, Japan

[73] Assignee: Pioneer Electronic Corporation, Tokyo, Japan

[21] Appl. No.: 171,073

[22] Filed: Mar. 21, 1988

[30] Foreign Application Priority Data

Apr. 15, 1987 [JP] Japan .................................. 62-93907

[51] Int. Cl.⁵ ..................... G11B 07/12; G11B 03/10; G11B 21/08
[52] U.S. Cl. ................................. 369/44.11; 369/111; 369/249; 369/219; 369/44.21
[58] Field of Search ..................... 369/43, 44, 45, 219, 369/221, 256; 350/247; 250/201 D

[56] References Cited

U.S. PATENT DOCUMENTS 4,547,871 10/1985 Sugiyama et al. .................... 369/45
4,570,249 2/1986 Malissin et al. ...................... 369/219
4,583,212 4/1986 Koide et al. .......................... 369/219
4,823,336 4/1989 Inada et al. .......................... 369/219

Primary Examiner—Stuart S. Levy
Assistant Examiner—Kenneth B. Wells
Attorney, Agent, or Firm—Sughrue, Mion, Zinn, Macpeak & Seas

[57] ABSTRACT

A pickup actuator includes a slider, an optical pickup unit, and at least one suspension arm extending from the slider for suspending the pickup unit. The pickup unit includes at least one bobbin surrounding a yoke plate, upon which a first coil is wound, and further transversely mounted coils attached to the first coil. The coils collectively control movement of the pickup unit in tracking, focusing and tilt directions thereof. A further bobbin connected to the slider surrounds the yoke plate and includes a further coil wound thereabout for driving the slider and the pickup unit radially of an associated optical disk.

1 Claim, 3 Drawing Sheets

PICKUP ACTUATOR FOR DISK-TYPE MEDIA

BACKGROUND OF THE INVENTION

The present invention relates to a pickup actuator, and particularly to a pickup actuator having an improved magnetic circuit design which enables the sliding mechanisms to be made light in weight.

Disk players such as video disk and CD players employ optical pickups for reading out information stored on an optically encoded disk. The pickup is provided with a magnetic circuit which is made capable of finely driving an objective lens along a focal axis for focusing, and in the direction of the encoded information (pits) for tracking. A carriage mechanism for driving the pickup for moving the same in the radial direction of the disk is also provided.

The carriage mechanism is provided with magnetic circuits together with a guide rail which guide the pickup along its stroke. The number of magnetic circuits is three or more in all, together with the magnetic circuit provided in the pickup. The magnetic circuits in the past have been made large and long, making the carriage mechanism overly long and heavy.

An example of a conventional device is shown in FIG. 5. In this device, the pickup 1 is integrated with a frame 3, which forms a linear motor, via a stay 2. Yoke plates 4 constituting a magnetic circuit pass through openings provided in the frame 3. The frame 3 is disposed in an air gap 6 formed by magnets 5, and is movably supported by a guide bar 7 for linear movement.

The pickup apparatus of the conventional type includes 3 independent magnetic circuits. The magnetic circuits of the carriage mechanism are so long that the total weight is made quite heavy. The power supply system for driving the coils is extremely complicated and requires a large driving current.

SUMMARY OF THE INVENTION

The present invention is intended to simplify the arrangement of the magnetic circuit system of a carriage mechanism to thereby reduce the overall weight of the system. In order to obtain this object, the pickup actuator includes at least one suspended bobbin supporting a coil and loosely fitted around a yoke plate, a suspension arm for suspending the bobbin, at least one second coil attached to a side surface of the first coil, and a pickup unit attached to the bobbin.

BRIEF DESCRIPTION OF THE DRAWING FIGURES

DESCRIPTION OF THE PREFERRED EMBODIMENTS

Figure 1:
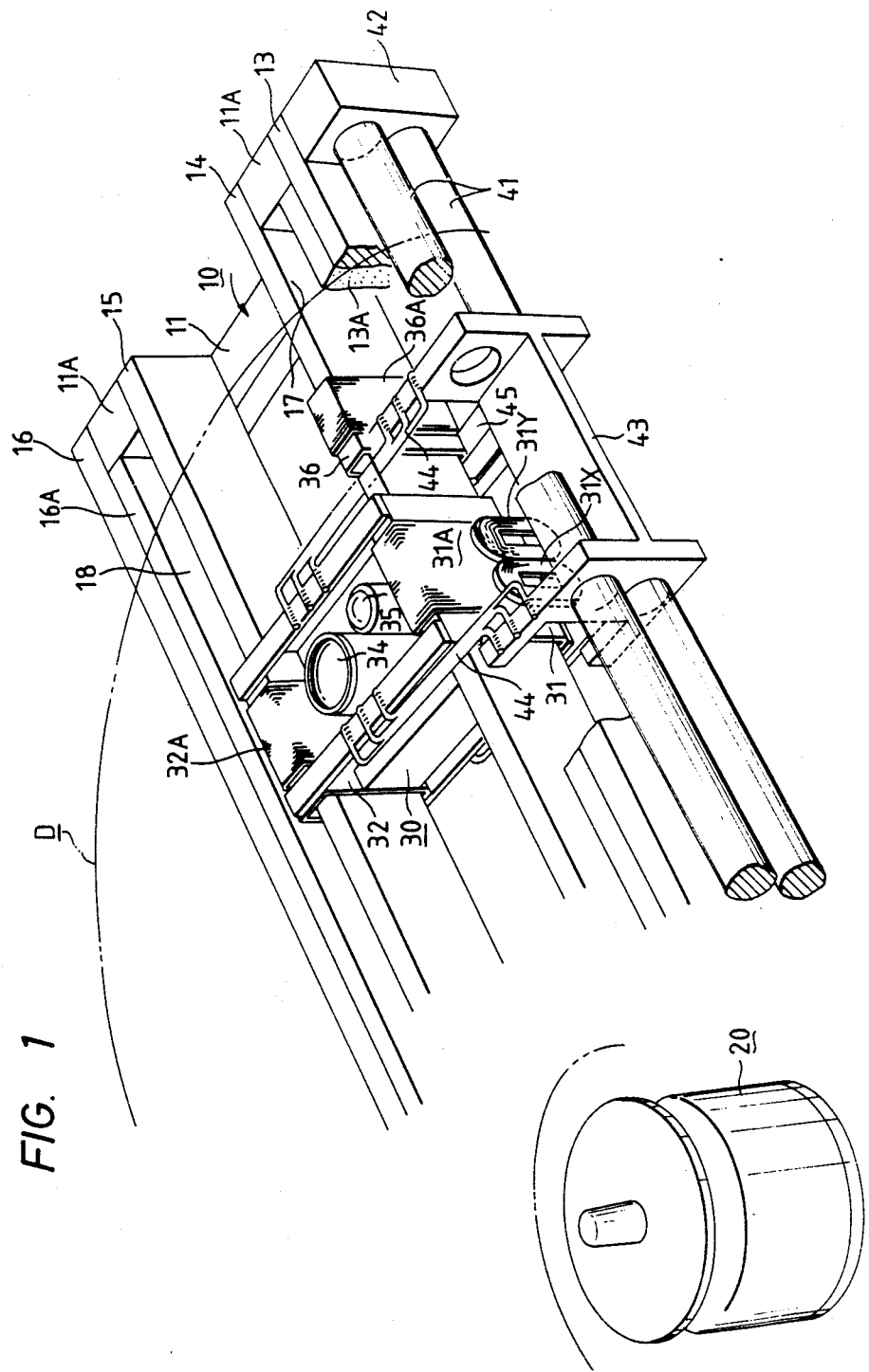
FIG. 1 is a perspective view showing a part of the pickup actuator according to the present invention.
Figure 2:
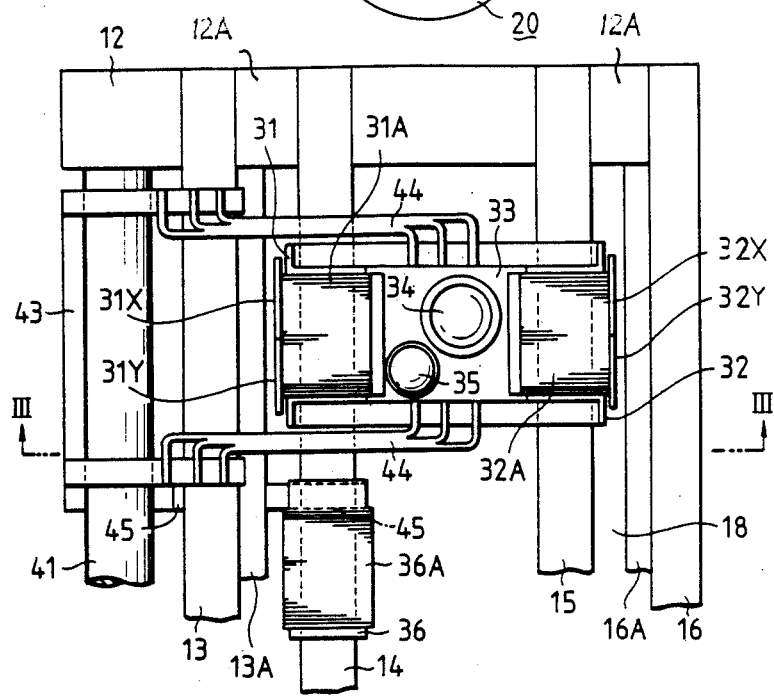
FIG. 2 is a plan view of the apparatus of FIG. 1.
Figure 3:
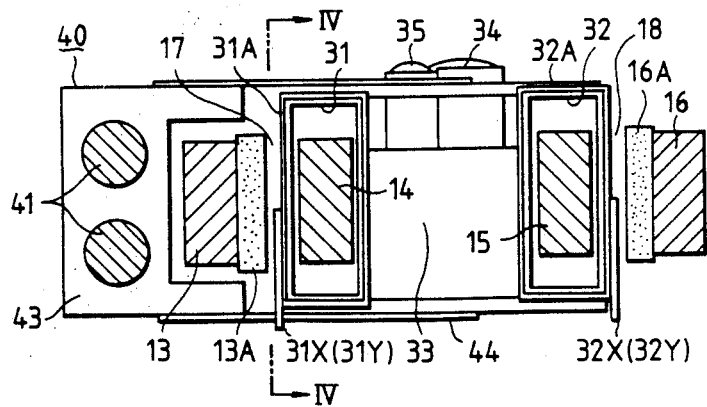
FIG. 3 is a cross-sectional view taken on line III—III of FIG. 2.
Figure 4:
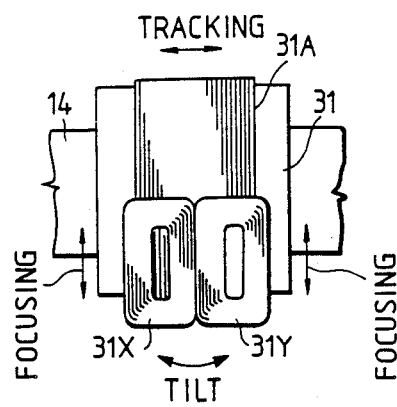
FIG. 4 is a side-view taken along line IV—IV of FIG. 3.
Figure 5:
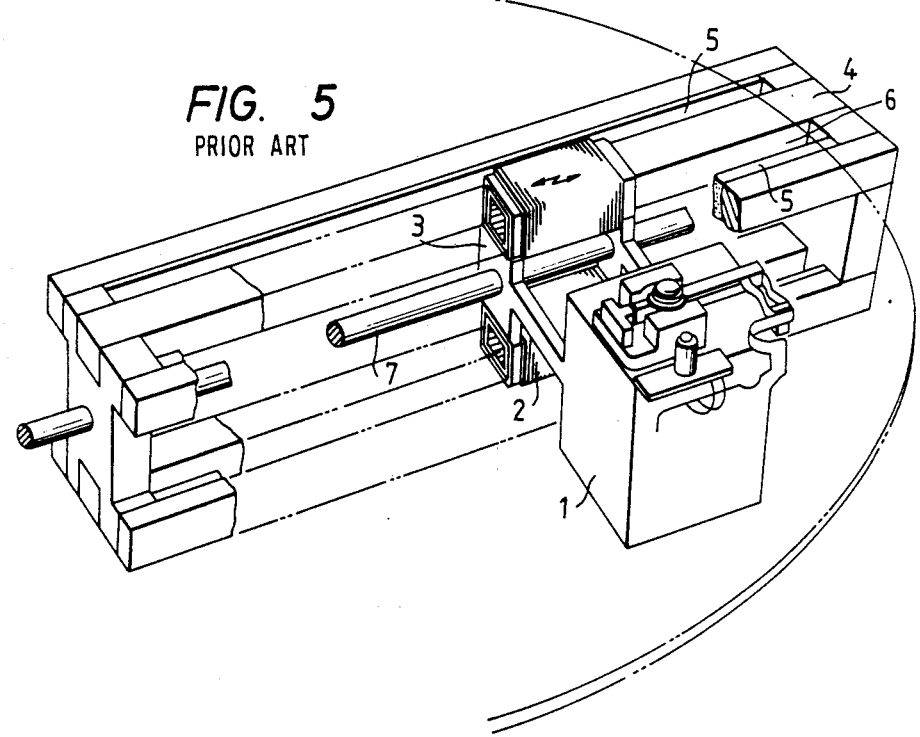
FIG. 5 is a perspective view showing a conventional pickup actuator device.

Referring to FIGS. 1-4, an embodiment of the present invention will be described. In the drawings, reference numeral 10 designates a magnetic circuit unit disposed on a chassis. A spindle motor unit is disposed at an end portion of the magnetic circuit unit 10. A carriage mechanism 40 is movably attached to the magnetic circuit unit 10 so as to move a pickup unit 30 in the radial direction of disk D.

The carriage mechanism unit 40 includes a slider 43, through which a pair of guide rails 41 supported by holders 42 are inserted, and includes bobbins 31, 32 suspended from electrically conductive suspension arms 44 extending from the slider 43. A pair of yoke plates 14 and 15 extend in the movement direction of the carriage 40 and are loosely inserted through the bobbins 31, 32. The bobbins 31 and 32 are supported by the arms 44 in the floating state relative to the yoke plates 14, 15. The bobbins are movable in the radial direction of the disk via the carriage mechanism unit .40 and the arms 44.

The pickup unit 30 is provided with an objective lens 34, a tilt detection lens 35, and associated circuitry. The lenses are disposed on a support 33 located between the bobbins 31 and 32 and are driven together with the carriage mechanism 40.

In the magnetic circuit unit 10, plates 11 and 12 are disposed with a suitable distance therebetween, not less than the stroke of the pickup unit. Two pairs of yoke plates 13 and 14, 15 and 16 are respectively attached on opposite sides of two sets of spacers 11A, 12A. Air gaps 17 and 18 corresponding to the thicknesses of the spacers 11A and 12A are formed between the yoke plates 13 and 14 and between the yoke plates 15 and 16, respectively. Plate-like magnets 13A and 16A are fixed to the yoke plates 13 and 16 along their inner surfaces.

A bobbin 36 is fittingly inserted on the yoke plate 14, the bobbin 36 being integrated with the slider 43 via a carriage coil stay 45. A carriage coil 36A is wound on the bobbin 36 to perform the carriage displacement operation. Tracking coils 31A and 32A are wound on the bobbins 31 and 32, respectively. Pairs of tilting and focusing coils 31X and 31Y, 32X and 32Y are wound respectively on the tracking coils 31A and 32A such that the coils 31X and 31Y, 32X and 32Y are wound in planes perpendicular to the planes in which the tracking coils 31A and 32A are wound.

A driving current is supplied to the tracking coils 31A and 32A, and to the tilting and focusing coils 31X, 31Y, 32X and 32Y via the suspension arms 44. A current is supplied to the carriage coil 36A by a feeder line (not shown) extending along the carriage coil stay 45.

A tracking control current is supplied to the tracking coils 31A and 32A to control the positioning of a reading light beam with respect to the track of the disk D, that is, so that the reading light beam accurately impinges upon the pits formed in the disk. The same current is applied to the tilting and focusing coils 31X and 31Y so as to control focusing. If the disk D is slanted or otherwise tilted, a control current is supplied to the pair of tilting and focusing coils 31X and 31Y so as to control the tilt of the pickup unit. A carriage driving current is supplied to the carriage coil 36A to control the advance of the pickup unit 30.

In order to drive the pickup unit 30 in the focusing direction, in the tracking direction, or in the tilting direction, only the coil elements of the pickup unit 30 are driven, without moving the slider 43. That is, the position and attitude of the pickup unit can be controlled by appropriately energizing the tracking coils 31A and 32A, and the tilting and focusing coils 31X, 31Y, 32X and 32Y wound on the bobbins 31 and 32. The fact that the slider 43 does not move particularly in the tracking direction, i.e., in the sliding direction of the slider 43, means that no sliding friction is involved, enabling positional control to be more easily and finely adjusted by the servo mechanism associated with the optical system.

When the pickup unit 30 is driven in the radial direction, a current is supplied to the carriage coil 36A wound on bobbin 36 so as to drive the whole of the carriage mechanism 40 including the slider 43. In driving the carriage and the pickup unit, small currents will suffice to energize each of the coils because there are no heavy magnets required to be moved. Moreover, the construction allows the magnets 13A and 16A to be commonly employed, reducing the actual number of magnets required.

As will be apparent from the foregoing description, the pickup actuator according to the present invention is arranged so that all of the tracking, focusing and carriage movement coils are disposed in the air gap of a magnetic circuit unit constituted by a pair of yoke plates and magnets fixed to the inner sides of the yoke plates, so that the coils can be driven by a common magnetic circuit unit. Accordingly, the various magnetic circuits can be simplified and the weight of the overall mechanism can be reduced.

I claim:

1. An actuator for an optical pickup unit, comprising:
    a first pair of first and second yoke plates having an air gap therebetween;
    a second pair of first and second yoke plates having a second gap therebetween;
    an air gap defined between said first and second pairs of yoke plates;
    each of said first yoke plates including an elongated magnet fixed thereto;
    guide means extending in parallel with said first and second pairs of yoke plates;
    slider means slidably received on said guide means;
    a pickup unit including at least one lens unit;
    means for supporting said pickup unit including at least one suspension arm connected at one end to said pickup unit and at a second end to said slider;
    said pickup unit further including first and second bobbins disposed surrounding said second yoke plates, respectively, first and second coils wound about said first and second bobbins, for controlling positioning of said pickup unit in a tracking direction, a portion of said first and second coils facing said elongated magnets;
    a pair of third coils supported by each of said first and second coils and facing said elongated magnets, said third coils controlling positioning of said pickup unit in focusing and tilt directions;
    a third bobbin rigidly connected to said slider and surrounding one of said second yoke plates; and
    a fourth coil wound on said third bobbin and having a portion facing one of said elongated magnets, for controlling the advance of said pickup unit in a radial direction of a disk.

* * * * *